United States Patent

Okuyama et al.

Patent Number: 5,706,136
Date of Patent: Jan. 6, 1998

[54] OPTICAL SYSTEM, AND IMAGE OBSERVING APPARATUS AND IMAGE PICKUP APPARATUS USING IT

[75] Inventors: Atsushi Okuyama, Tokorozawa; Shoichi Yamazaki, Yokohama, both of Japan

[73] Assignee: Canon Kabushiki Kaisha, Tokyo, Japan

[21] Appl. No.: 607,387

[22] Filed: Feb. 27, 1996

[30] Foreign Application Priority Data

Feb. 28, 1995 [JP] Japan ................... 7-066995

[51] Int. Cl.$^6$ ................................. G02B 27/14
[52] U.S. Cl. ..................... 359/630; 359/631; 359/633
[58] Field of Search ........................ 359/630, 631, 359/632, 633

[56] References Cited

U.S. PATENT DOCUMENTS

| | | | |
|---|---|---|---|
| 4,383,740 | 5/1983 | Bordovsky | 359/631 |
| 4,775,217 | 10/1988 | Ellis | 350/538 |
| 4,962,313 | 10/1990 | Rose | 250/311 |
| 5,093,567 | 3/1992 | Staveley | 250/221 |
| 5,121,099 | 6/1992 | Hegg et al. | 340/461 |
| 5,189,452 | 2/1993 | Hodson | 353/94 |
| 5,319,207 | 6/1994 | Rose | 250/396 R |
| 5,357,372 | 10/1994 | Chen | 359/637 |
| 5,436,763 | 7/1995 | Chen | 359/565 |
| 5,459,612 | 10/1995 | Ingleton | 359/630 |
| 5,483,307 | 1/1996 | Anderson | 353/98 |
| 5,506,728 | 4/1996 | Edwards | 359/629 |
| 5,543,968 | 8/1996 | Freeman | 359/631 |

FOREIGN PATENT DOCUMENTS

| | | |
|---|---|---|
| 58-78116 | 5/1983 | Japan . |
| 3-180810 | 8/1991 | Japan . |
| 5-303054 | 11/1993 | Japan . |
| 5-303055 | 11/1993 | Japan . |
| 5-303056 | 11/1993 | Japan . |
| 5-323229 | 12/1993 | Japan . |

*Primary Examiner*—David C. Nelms
*Assistant Examiner*—Ricky Mack
*Attorney, Agent, or Firm*—Fitzpatrick, Cella, Harper & Scinto

[57] ABSTRACT

The present invention relates to an optical system apparatus, which has a first surface symmetric with respect to only one symmetry plane and a second surface symmetric with respect to only the symmetry plane, in which the first plane is a reflective, concave surface and is inclined relative to a reference axial ray present in the symmetry plane. Further, a local power of the second surface changes from a positive to a negative.

49 Claims, 14 Drawing Sheets

OPTICAL SYSTEM, AND IMAGE OBSERVING APPARATUS AND IMAGE PICKUP APPARATUS USING IT

BACKGROUND OF THE INVENTION

1. Field of the Invention

The present invention relates to an optical system, and more particularly, to an optical system suitable for applications in image observing apparatuses such as a finder of a camera and a so-called head-mounted display, and in image pickup apparatuses such as cameras.

2. Related Background Art

For the head-mounted display, a variety of optical systems have been devised heretofore in order to compactify the entire apparatus.

For example, Japanese Laid-open Patent Application No. 58-78116 discloses an optical apparatus for observing an object image on a primary image plane, obtained by a photographing optical system, through an optical element in a prism shape having a concave, spherical, reflecting surface set as inclined to the observer's eye.

Since the reflecting surface is an inclined spherical surface in this conventional example, it is difficult to correct well for optical aberrations including astigmatism, occurring there. The official gazette of the above application describes a need to add a new lens system for improving correction for the aberrations.

Japanese Laid-open Patent Application No. 5-303055 discloses an optical system having an additional lens system (relay lens system) of this type. Addition of such a relay lens system, however, lengthens the total length of the optical system, resulting in a defect of spoiling compactification of the optical system.

Japanese Laid-open Patent Applications No. 5-303054, No. 5-303056, and No. 5-323229 disclose optical systems in which one reflecting surface out of the following surfaces is inclined relative to the optical axis of the observer's eye in order to improve compactification and aberrations of optical system: normal aspherical surfaces of revolution having high-order aspherical terms; paraboloids and ellipsoids of revolution given by conical functions, each defined by a conical coefficient; toric aspherical surfaces (or anamorphic aspherical surfaces), each expressed by mutually different aspherical functions on orthogonal coordinate axes.

These optical systems, however, need to be corrected for distortion, curvature of field, and focus difference in orthogonal directions (i.e., astigmatism). A desired method for focusing (diopter adjustment) of the so-called decentering optical system with the inclined reflecting surface is to move the focal plane of the optical system (an image display device or an image pickup device), because moving the optical system causes a great change of optical performance. To realize it, a desired optical system is telecentric with respect to the focal plane.

Checking the above conventional examples from this viewpoint, the optical system in Japanese Laid-open Patent Application No. 5-303054 is corrected for curvature of field and distortion, but still has astigmatism left without being corrected for.

The optical system in Japanese Laid-open Patent Application No. 5-303056 is corrected for astigmatism and distortion, but still has curvature of field left without being corrected for.

Further, the optical system in Japanese Laid-open Patent Application No. 5-323229 is corrected for curvature of field, astigmatism, and distortion, but it has angles of rays largely inclined relative to the focal plane, which, in the case of a display device such as a liquid crystal panel or an image pickup device such as a CCD being located on the focal plane, causes a defect of greatly degrading the performance because of an angle dependence of characteristics of the device.

Although the optical systems proposed in the above applications are corrected for distortion, distortion is recognized at a glance, and correction for distortion is thus inadequate.

As described above, the arrangements with a single, aspherical, reflecting surface had the defect that all the aberrations were unable to be adequately corrected for.

Japanese Laid-open Patent Application No. 3-180810 discloses increasing the F-number for the optical system by setting the view point of observer away and arranging the optical system in such a manner that curvature of field and astigmatism are corrected by increasing the depth of focus of the optical system and that distortion distortion is corrected by an aspherical surface having a cross term (e.g., xy) in the orthogonal coordinate system (x, y, z).

Since this optical system is based on the method for observing an image from the view point set away, it does not permit, however, wider-angle arrangement or larger-screen arrangement. Although the optical system was arranged in the telephoto type in combination of a convex mirror with a concave mirror, it had a defect of the large size as a whole against compactification.

SUMMARY OF THE INVENTION

An object of the present invention is to provide an optical system formed in a very simple arrangement and well corrected for the various aberrations.

An optical system of the present invention has a first surface and a second surface, each surface being symmetric with respect to only one symmetry plane, wherein the first surface is a reflecting concave surface, which is inclined to a reference axial ray present in the symmetry plane, and wherein a local power of the second surface changes from a positive to a negative.

In one embodiment of the optical system of the present invention, the local power of the second surface as to rays in the symmetry plane and/or the local power of the second surface as to rays in a plane being perpendicular to the symmetry plane and including the reference axial ray and in a plane parallel to the foregoing plane changes from a positive to a negative along a cut line where the symmetry plane cuts the second surface.

In the optical system of the present invention, the local power of the second surface preferably changes from a positive to a negative along the cut line in a direction of from a shorter optical pathlength to a longer optical pathlength between the first surface and the second surface.

An image observing apparatus and an image pickup apparatus of the present invention are characterized by using the optical system of the present invention.

DETAILED DESCRIPTION OF THE PREFERRED EMBODIMENTS

Figure 1:
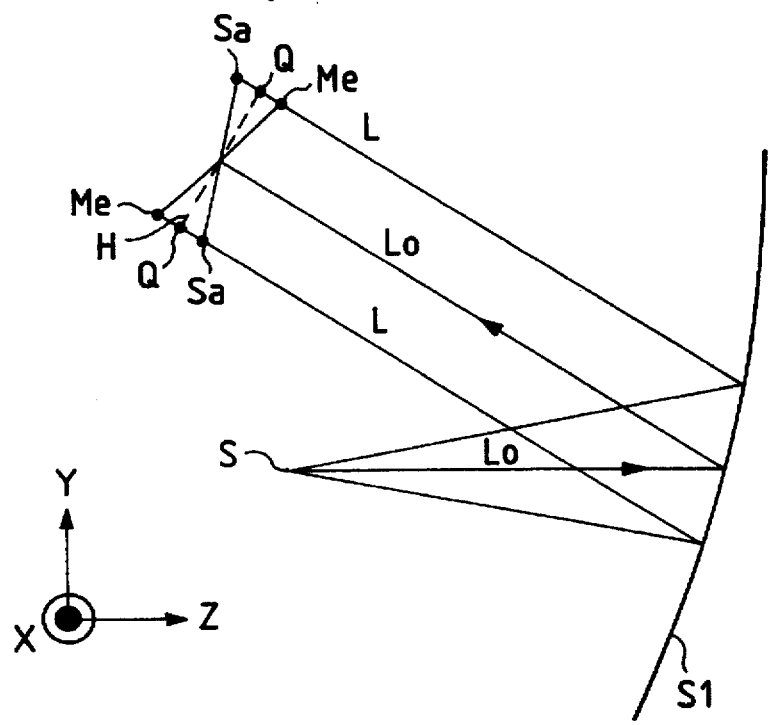
FIG. 1 is a drawing to illustrate the optical action of the present invention.
Figure 2:
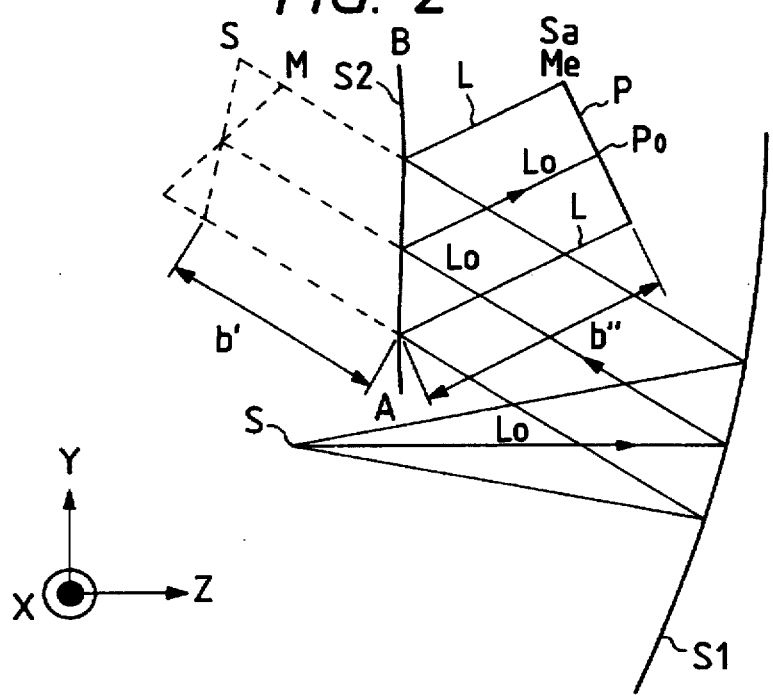
FIG. 2 is a drawing to illustrate the optical action of the present invention.

The optical action of the fundamental arrangement of the optical system according to the present invention is first explained referring to FIG. 1 and FIG. 2. In the drawings, S represents a stop, S1 a first reflecting surface (optically acting surface), S2 a second reflecting surface (optically acting surface), and P is a focal plane. Although in the following description the optical system is explained as a system in which light originates from the stop S side to reach the focal plane P, for convenience's sake, the optical system, when applied to an actual image observing optical system, is arranged as a system in which the light originates from the focal plane P (image display device) to be incident to the stop S (the pupil of observer).

In the optical system of FIGS. 1 and 2, let us define a reference axial ray Lo as a ray emerging from the center of the stop S and impinging on the center $P_o$ of the focal plane P nearly normally thereto. Further, principal rays L are rays emerging from the center of the stop S and impinging upon respective points on the focal plane P nearly normally thereto.

As shown in FIG. 1, the first reflecting surface S1 is determined in such a shape that the principal rays L from the stop S become approximately telecentric toward the image side after reflected by the first reflecting surface S1 and that an average image plane is nearly superimposed on a plane H perpendicular to the reference axial ray Lo.

Here, considering light beams originating from an object at almost infinity and passing the stop S in a cross section being parallel to the plane of the drawing and including the reference axial ray Lo (the Y-Z cross section as detailed later) and in a cross section being perpendicular to the plane of the drawing and including the reference axial ray Lo (the X-Z cross section as detailed later), the average image plane is a plane including intermediate points between image positions of the rays in the respective cross sections. In FIG. 1, in a light beam at a certain field angle, points Me are image points of the rays in the Y-Z cross section, and points Sa are image points of the rays in the X-Z cross section. In this case middle points Q between the points Me and the points Sa in the principal rays L are points on the average image plane, and differences between the points Me and the points Sa are astigmatism. Telecentricity of principal rays and distortion are affected by the total shape of reflecting surface, and an imaging state of each beam (curvature of field, astigmatism) is affected by the local shape of surface.

As explained in the description of the conventional examples, it is difficult to achieve correction for these aberrations by a single reflecting surface. In the present invention, therefore, the first reflecting surface S1 is mainly arranged to maintain telecentricity of principal rays and correct for distortion and to align the average image plane with the plane H, and the second reflecting surface S2 corrects for remaining astigmatism.

The second reflecting surface S2 is formed in such a shape as to mainly correct for astigmatism of the beam, as shown in FIG. 2. Specifically, the shape can be determined in such a manner that local image magnifications of rays in the Y-Z cross section increase from the near side (A) with respect to the first reflecting surface S1 toward the far side (B) and that local image magnifications of rays in the X-Z cross section decrease from the near side (A) with respect to the first reflecting surface toward the far side (B). A magnification of a local surface is a ratio b"/b' of an image distance b" to an object distance b' of the outstanding surface, as shown in FIG. 2.

The second reflecting surface S2 is formed in such a shape that in the Y-Z cross section from the near side (A) to the first reflecting surface toward the far side (B) the local power ($\rho_L=-2N/r_L$) changes from a positive to a strong negative and that in the X-Z cross section from the near side (A) to the first reflecting surface toward the far side (B) the local power changes from a positive or a weak negative to a strong negative.

The two reflecting surfaces having the shapes as described herein can correct for distortion, curvature of field, and astigmatism and maintain telecentricity. If a third optically acting surface S3 (not shown) is placed near the focal plane between the second reflecting surface S2 and the focal plane P, the optical system can be corrected for slight distortion and deviation of telecentricity caused by the shape of the second reflecting surface S2, thus further improving partial changes of the image plane.

The third optically acting surface S3 may be either a refracting surface or a reflecting surface. When the third optically acting surface S3 is provided near the focal plane P, it can decrease overlap of beams reaching the respective points (image points) on the focal plane P and it enables partial correction of image points by a partial change of shape of surface, thereby readily correcting for aberrations that the first reflecting surface S1 and the second reflecting surface S2 as described above fail to correct for.

Further, if the first reflecting surface S1, the second reflecting surface S2, and the third optically acting surface S3 are formed on a medium such as glass or plastics, the optical system of the present invention can be realized by a single optical element, which is very advantageous in compactification and reduction of cost.

Figure 3B:
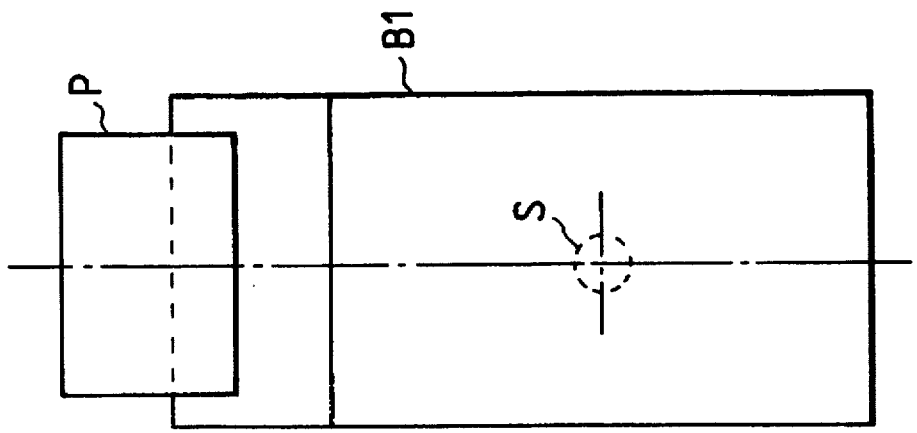
FIGS. 3A and 3B are schematic drawings to show the major part of Embodiment 1 of the image observing apparatus according to the present invention.
Figure 3A:
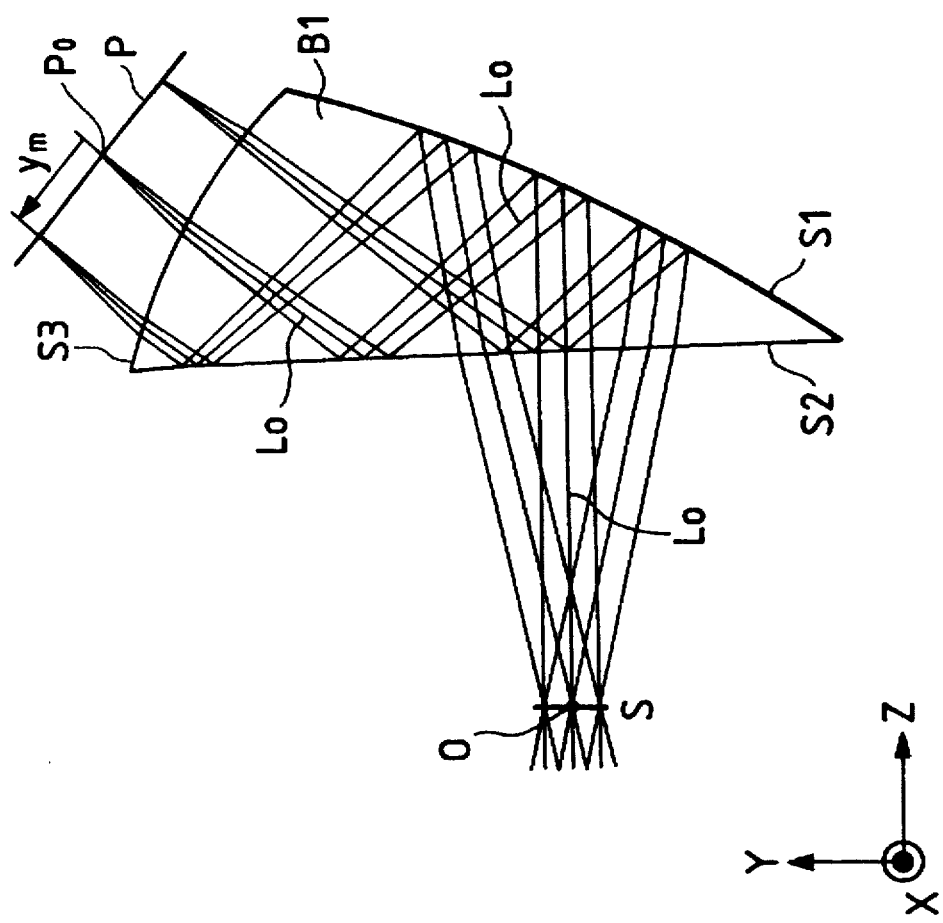
Figure 4A:
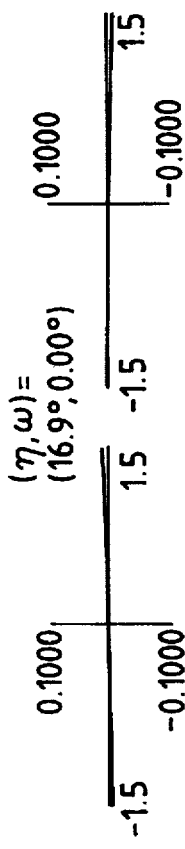
FIGS. 4A to 4D are aberration diagrams to show aberrations of the optical system in Embodiment 1.
Figure 4B:
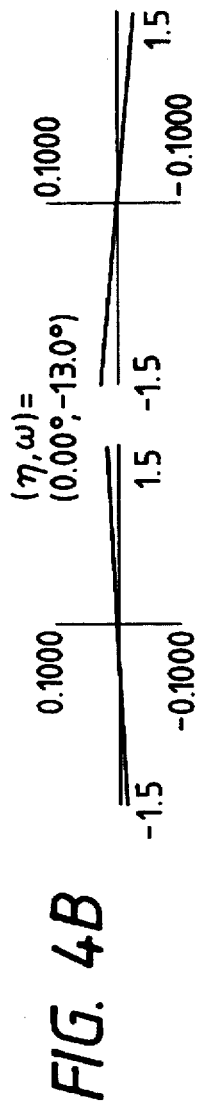
Figure 4C:
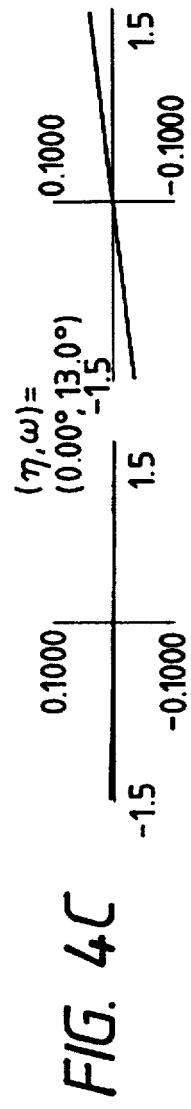
Figure 4D:
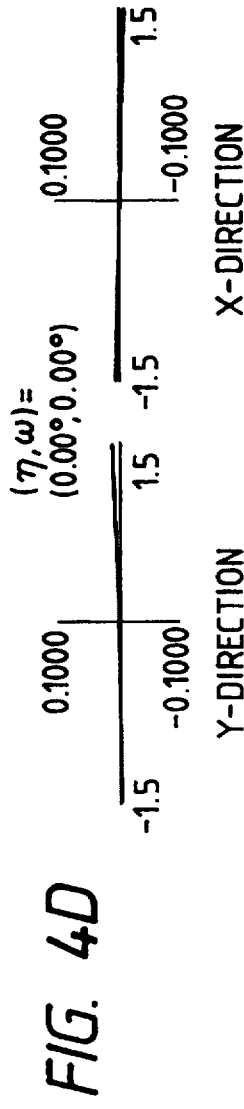

FIGS. 3A and 3B are schematic drawings to show the major part of Embodiment 1 of the image observing apparatus according to the present invention. In the drawings, B1 is an optical element, which has the first, the second, and the third optically acting surfaces S1, S2, S3. Each of the three acting surfaces is formed in a shape symmetric with respect to only one plane (the YZ plane). S represents a desired pupil position of the observer, and P a display surface of an image display device.

The third optically acting surface S3 is shaped in an aspherical surface symmetric with respect to only the symmetry plane, and is located nearly perpendicular to the reference axial ray Lo emerging from the center of the display surface P nearly normally to the display surface P. The second optically acting surface S2 is shaped in an aspherical surface symmetric with respect to only the symmetry plane, and is located as inclined at such an angle as to totally reflect the reference axial ray Lo refracted by the third optically acting surface S3. The first optically acting surface S1 is an aspherical reflecting surface (obtained by depositing a reflecting film on a surface) of a totally strong concave surface which is symmetric with respect to only the symmetry plane, and is located as inclined relative to the reference axial ray Lo totally reflected by the second optically acting surface S2. The reference axial ray Lo reflected by the first optically acting surface S1 passes through the second optically acting surface S2 to reach the pupil S.

The optical action of the present embodiment is next explained. A light beam emerging from an image displayed on the display surface P first travels through the third optically acting surface S3 toward the second optically acting surface S2 and is then totally reflected by the surface S2 toward the first optically acting surface S1. Then the beam is reflected by the surface S1 to become a converging beam, and the beam travels again to the second optically acting surface S2. The beam passes through this surface S2 this time to form a virtual image of the image and to reach the observer's pupil S, whereby the observer can visually recognize the virtual image.

Figure 18:
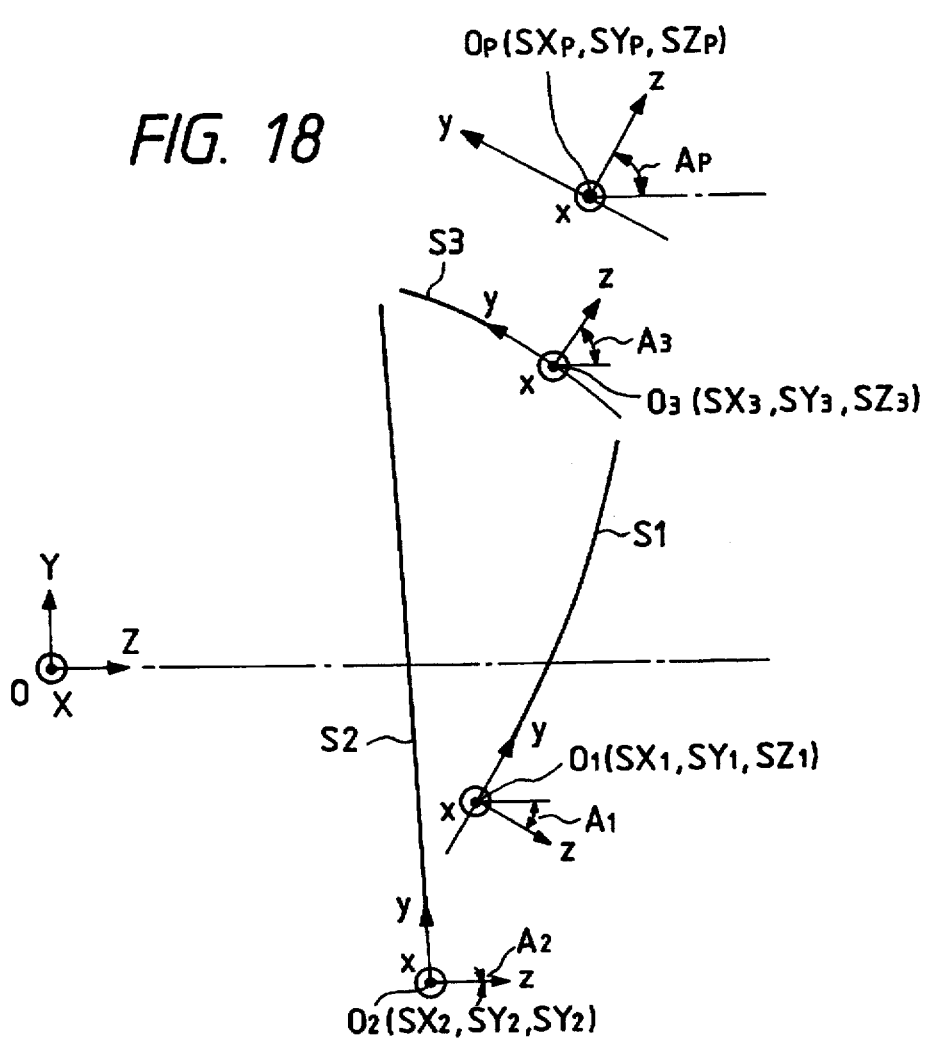
FIG. 18 is an explanatory drawing of an absolute coordinate system and local coordinate systems employed in each embodiment.

Since the optical system of the present embodiment is composed of the decentering surfaces, an absolute coordinate system and local coordinate systems are set in order to express the shape of the optical system. FIG. 18 is an explanatory drawing of the absolute coordinate system and local coordinate systems. This is next explained.

The origin of the absolute coordinate system is set at the center O of the desired pupil position S of observer, and the Z-axis is a straight line perpendicular to the pupil plane through the point O, as located on the symmetry plane. The Y-axis is a straight line making an angle of 90° counterclockwise relative to the Z-axis on the symmetry plane and through the origin O. The X-axis is a straight line perpendicular to the Y- and Z-axes through the origin O. The Z-axis is superimposed on the reference axial ray Lo coming from the center of the display surface P of the image display device nearly normally to the display surface P to reach the center of the pupil S.

The origin Oi of each local coordinate system is set at absolute coordinates (SXi, SYi, SZi). The z-axis of each local coordinate system is a straight line passing through the origin Oi in the YZ plane and making an angle Ai with the Z-axis of the absolute coordinate system. The y-axis is a straight line passing through the origin Oi and making an angle of 90° counterclockwise relative to the z-axis on the symmetry plane. The x-axis is a straight line passing through the origin Oi and being perpendicular to the y-axis and the z-axis.

The shape of each surface is expressed by local coordinates. Each of the shapes of the optically acting surfaces in each embodiment of the present invention is a shape as defined by the following function, having a conical function defined by the conical coefficient, and Zernike polynomials.

$$z = c(x^2+y^2)/[1+\{1-(1+k)c^2(x^2+y^2)\}^{1/2}] +$$
$$c_1(x^2-y^2) +$$
$$c_2(-1+2x^2+2y^2) +$$
$$c_3(-2y+3x^2y+3y^3) +$$
$$c_4(3x^2y-y^3) +$$
$$c_5(x^4-6x^2y^2+y^4) +$$
$$c_6(-3x^2+4x^4+3y^2-4y^4) +$$
$$c_7(1-6x^2+6x^4-6y^2+12x^2y^2+6y^4) +$$
$$c_8(3y-12x^2y+10x^4y-12y^3+20x^2y^3+10y^5) +$$
$$c_9(-12x^2y+15x^4y+4y^3+10x^2y^3-5y^5) +$$
$$c_{10}(5x^4y-10x^2y^3+y^5)$$

In the above equation, c is the curvature as defined by $c=1/r$, where r is a fundamental radius of curvature of each surface.

Further, k is the conical coefficient of each surface, and $c_j$ is an aspherical coefficient of the j-th Zernike polynomial in each surface.

Table 1 shows data for the arrangement of Embodiment 1. In the table, f is a value corresponding to the focal length of the optical element B1, which is calculated by the following equation:

$$f = y_m/\tan(\theta)$$

where $\theta$ is an angle of incidence of incident light from an object at infinity and $y_m$ is a height of an image formed from rays of the incident light on the display surface P, and which is referred to simply as focal length herein.

TABLE 1

| | f = 25 | N = 1.4917 | | |
|---|---|---|---|---|
| Surface | S1 | S2 | S3 | P |
| 1/r | −1.300e−02 | −3.019e−03 | 1.000e−18 | |
| k | 3.357e+00 | 2.893e+01 | 0.000e+00 | |
| $c_1$ | −1.140e−03 | 3.475e−03 | −7.305e−03 | |
| $c_2$ | 1.230e−04 | 7.479e−04 | −7.869e−03 | |
| $c_3$ | −1.090e−05 | −6.391e−06 | −6.117e−05 | |
| $c_4$ | −4.055e−05 | −1.239e−04 | −1.321e−04 | |
| $c_5$ | −1.380e−06 | −8.946e−07 | −3.732e−05 | |
| $c_6$ | −5.544e−08 | −8.408e−08 | 1.586e−05 | |
| $c_7$ | −7.316e−08 | −1.282e−08 | −3.997e−06 | |
| $c_8$ | 4.901e−09 | −4.941e−09 | 3.691e−07 | |
| $c_9$ | −1.070e−09 | −1.295e−08 | −6.127e−07 | |
| $c_{10}$ | 1.202e−08 | −2.201e−08 | 4.124e−07 | |
| SX | 0.00 | 0.00 | 0.00 | 0.00 |

TABLE 1-continued

| | f = 25 | N = 1.4917 | | |
|---|---|---|---|---|
| Surface | S1 | S2 | S3 | P |
| SY | −9.03 | −20.56 | 19.26 | 26.08 (mm) |
| SZ | 23.92 | 20.53 | 29.43 | 30.17 (mm) |
| A | −30.70 | 0.29 | 54.37 | 50.00 (deg) |

Table 2 includes local radii of curvature and $r_{Ly}$ of the second optically acting surface S2 as expressed at six points on the acting surface. Coordinates in the table are local coordinates of the surface.

TABLE 2

| | x | |
|---|---|---|
| y | 0 | 8.01 |
| | $r_{Lx}$(mm) | |
| 19.28 | 372.15 | 126.63 |
| 31.57 | 119.31 | 55.94 |
| 43.87 | 99.74 | 43.92 |
| | $r_{Ly}$(mm) | |
| 19.28 | −1221.59 | −725.14 |
| 31.57 | 1295.43 | 3372.99 |
| 43.87 | 87.94 | 89.32 |

Figure 19A:
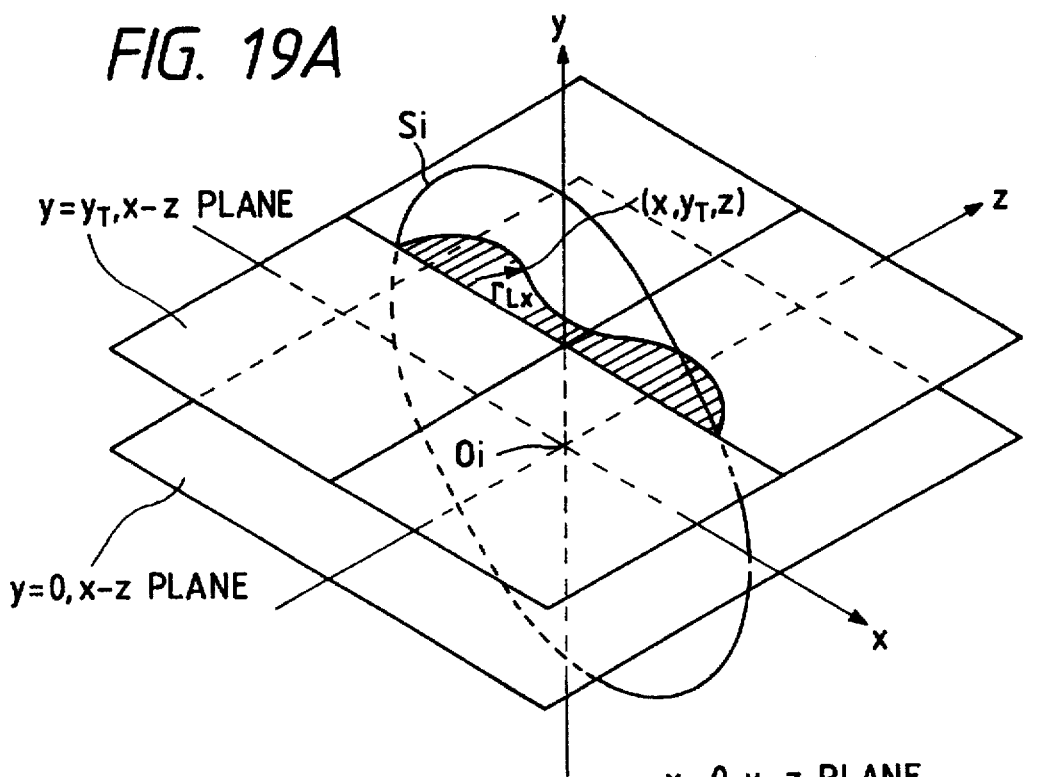
FIGS. 19A and 19B are explanatory drawings of local radii of curvature $r_{Lx}$ and $r_{Ly}$.
Figure 19B:
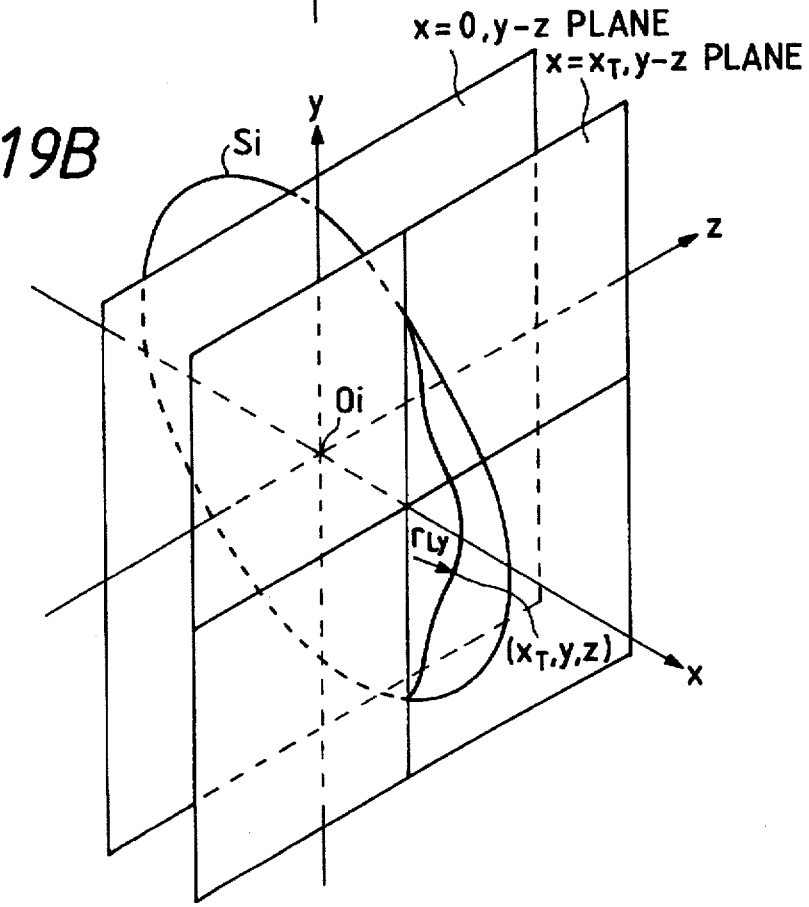

The local radii of curvature $r_{Lx}$ and $r_{Ly}$ are next explained. FIGS. 19A and 19B are explanatory drawings of the local radii of curvature $r_{Lx}$ and $r_{Ly}$.

The local radius of curvature $r_{Lx}$ is a local radius of curvature on an intersecting line between the surface Si and a plane parallel to the x-z plane (which is $y=y_T$ away in the drawing), as shown in FIG. 19A.

Further, the local radius of curvature $r_{Ly}$ is a local radius of curvature on an intersecting line between the surface Si and a plane parallel to the y-z plane (which is $x=x_T$ away in the drawing), as shown in FIG. 19B. Here, the local radius of curvature $r_{Lx}$ or $r_{Ly}$ takes a negative value when the optically acting surface is concave on the light incidence side.

A local optical power $\rho_{Lx}$ on the x-z plane is obtained from the following equation:

$$\rho_{Lx} = -2N/r_{Lx}$$

with the local radius of curvature $r_{Lx}$ and a refractive index N of a medium in which the light travels.

Further, a local optical power $\rho_{Ly}$ of the y-z plane is obtained from the following equation:

$$\rho_{Ly} = -2N/r_{Ly}$$

with the local radius of curvature $r_{Ly}$ and the refractive index N of the medium in which the light travels.

FIGS. 4A to 4D are aberration diagrams of Embodiment 1. The aberration diagrams indicate lateral aberrations at the image point on the reference axial ray Lo, the image points of ±ω in the y-direction to the reference axial ray Lo, and the image point of +η in the x-direction relative to the reference axial ray Lo.

Figure 5:
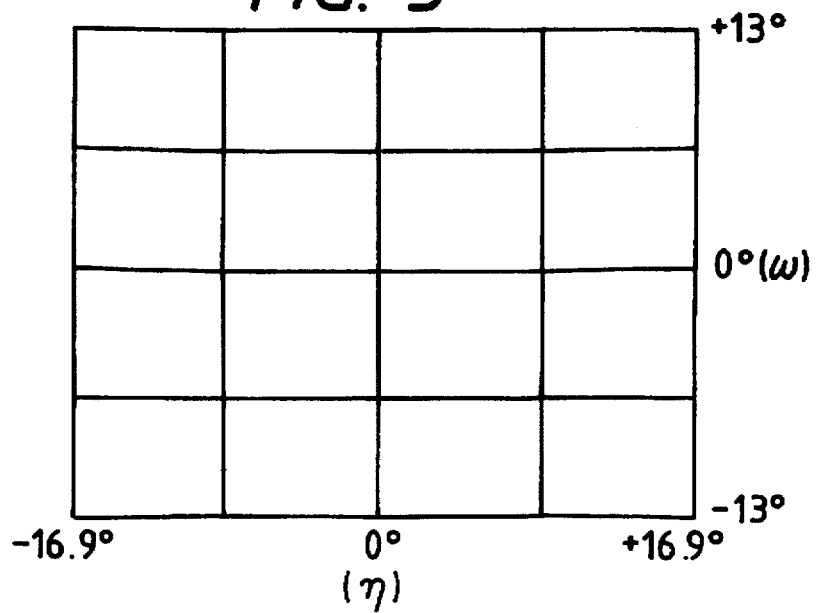
FIG. 5 is a drawing to show distortion by the optical system of Embodiment 1.

FIG. 5 shows distortion of an image of a grid object when ray trace from the pupil S to the display surface P is carried out in the image observing apparatus of the present embodiment. Supposing distortion of the image on the display surface P is pincushion distortion and if the ray trace is carried out from the display surface P to the pupil S for the optical system, distortion of image becomes of a barrel form in an opposite shape.

Figure 6:
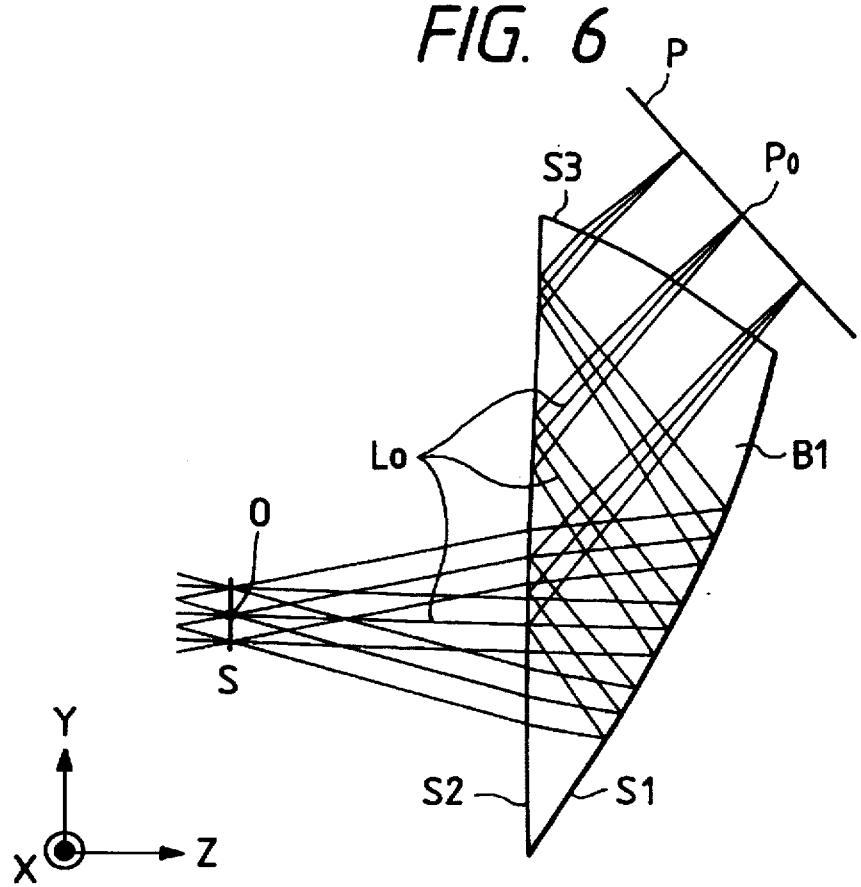
FIG. 6 is a schematic drawing to show the major part of Embodiment 2 of the image observing apparatus according to the present invention.
Figure 7A:
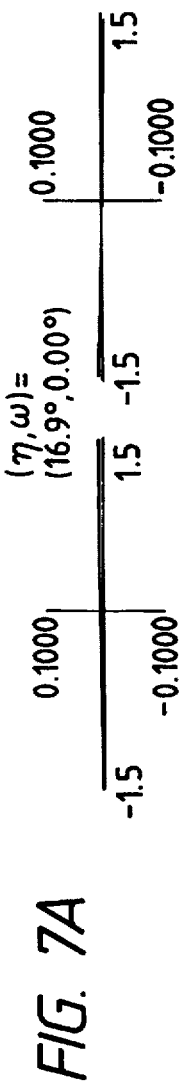
FIGS. 7A to 7D are aberration diagrams to show aberrations of the optical system in Embodiment 2.
Figure 7B:
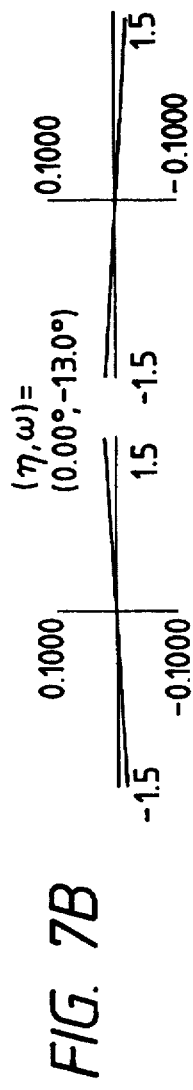
Figure 7C:
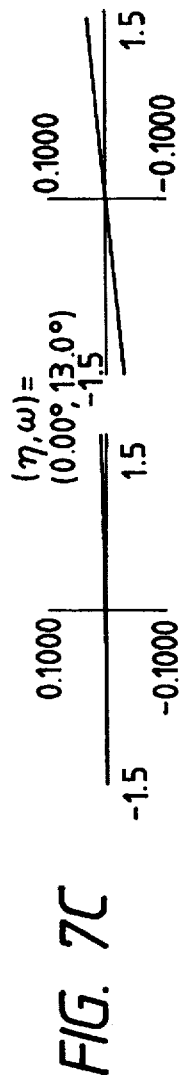
Figure 7D:
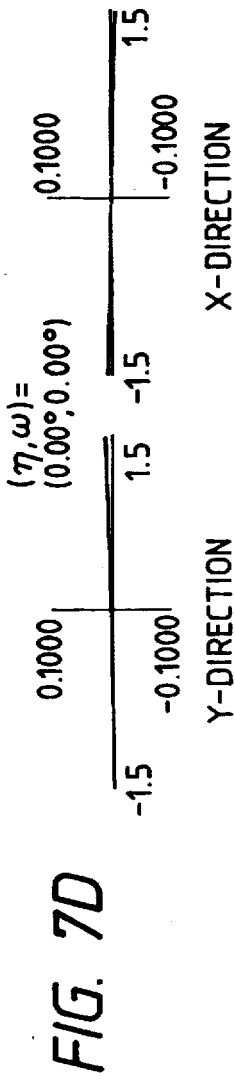

FIG. 6 is a schematic drawing to show the major part of Embodiment 2 of the image observing apparatus according to the present invention. The present embodiment has a shorter focal length of the total system than Embodiment 1 has, thereby achieving a wider-angle arrangement. Table 3 shows data for the arrangement of Embodiment 2.

TABLE 3

| | f = 20.5 | N = 1.4917 | | |
|---|---|---|---|---|
| Surface | S1 | S2 | S3 | P |
| 1/r | −1.197e−02 | −3.098e−03 | 1.000e−18 | |
| k | 3.638e+00 | 5.894e+01 | 0.000e+00 | |
| $c_1$ | −2.424e−03 | 6.045e−04 | −3.577e−03 | |
| $c_2$ | 1.241e−03 | 1.703e−03 | −1.144e−02 | |
| $c_3$ | −5.818e−05 | −1.654e−05 | 9.935e−05 | |
| $c_4$ | −1.016e−04 | −1.183e−04 | 5.979e−04 | |
| $c_5$ | −2.822e−06 | −3.624e−07 | −5.158e−06 | |
| $c_6$ | −8.333e−08 | 1.161e−07 | −1.996e−05 | |
| $c_7$ | 1.132e−07 | −1.273e−07 | 1.104e−05 | |
| $c_8$ | 3.918e−09 | −4.273e−09 | 3.470e−07 | |
| $c_9$ | −3.311e−09 | −1.754e−08 | −1.034e−06 | |
| $c_{10}$ | 2.136e−08 | −3.668e−08 | 3.706e−07 | |
| SX | 0.00 | 0.00 | 0.00 | 0.00 (mm) |
| SY | −13.79 | −14.41 | 20.87 | 22.97 (mm) |
| SZ | 16.11 | 17.12 | 21.72 | 28.24 (mm) |
| A | −33.64 | 2.95 | 63.43 | 44.00 (deg) |

Table 4 includes the local radii of curvature $r_L$ of the second optically acting surface S2 of the present embodiment at six points on the acting surface.

TABLE 4

| | x | |
|---|---|---|
| y | 0 | 7.43 |
| | $r_{Lx}$(mm) | |
| 13.09 | 194.78 | 100.45 |
| 24.36 | 85.73 | 50.16 |
| 35.62 | 64.39 | 34.95 |
| | $r_{Ly}$(mm) | |
| 13.09 | −224.21 | −203.66 |
| 24.36 | −1105.56 | −632.99 |
| 35.62 | 53.99 | 47.78 |

FIGS. 7A, 7B, 7C, and 7D are aberration diagrams of Embodiment 2. The aberration diagrams indicate lateral aberrations at the image point on the reference axial ray Lo, the image points of ±ω in the y-direction relative to the reference axial ray Lo, and the image point of +η in the x-direction relative to the reference axial ray Lo.

Figure 8:
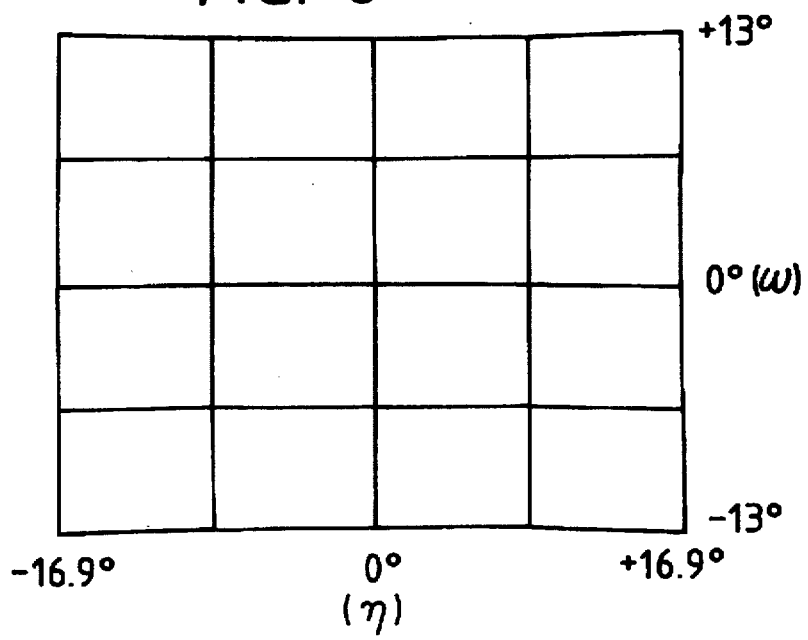
FIG. 8 is a drawing to show distortion by the optical system of Embodiment 2.

Further, FIG. 8 shows distortion of an image of the grid object when the ray trace is carried out from the pupil S to the display surface P in the present embodiment.

Figure 9:
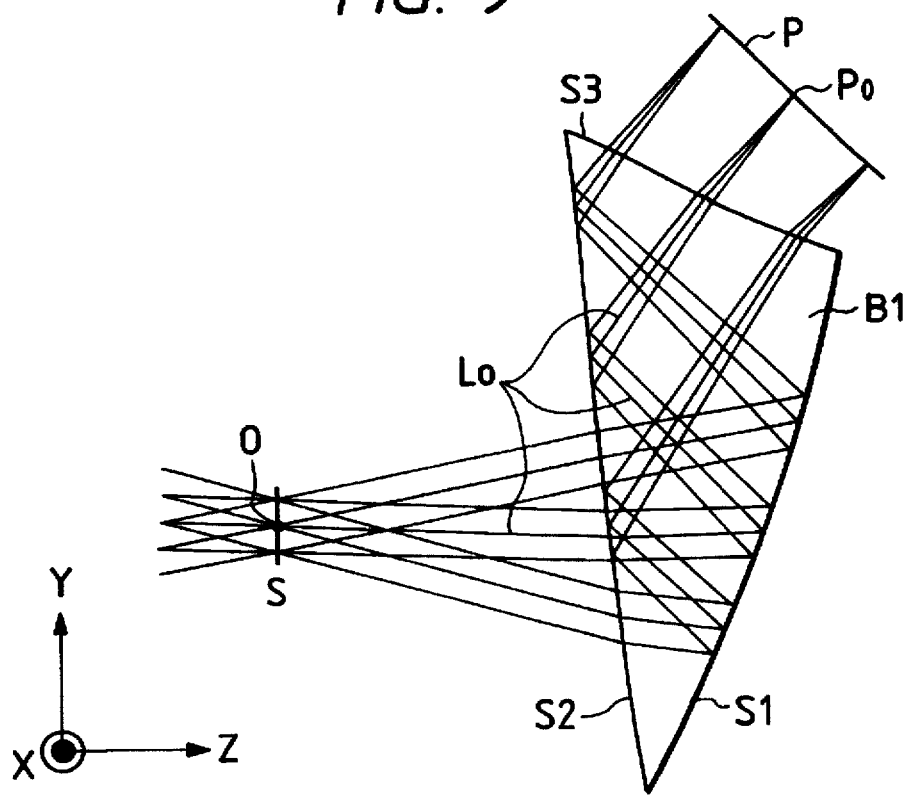
FIG. 9 is a schematic drawing to show the major part of Embodiment 3 of the image observing apparatus according to the present invention.
Figure 10A:
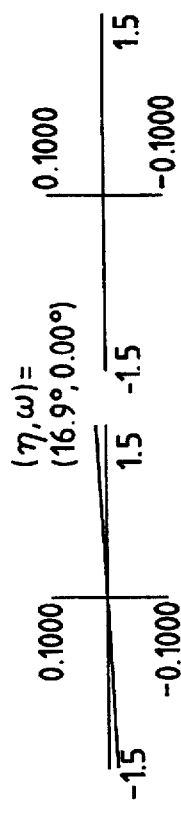
FIGS. 10A to 10D are aberration diagrams to show aberrations of the optical system in Embodiment 3.
Figure 10B:
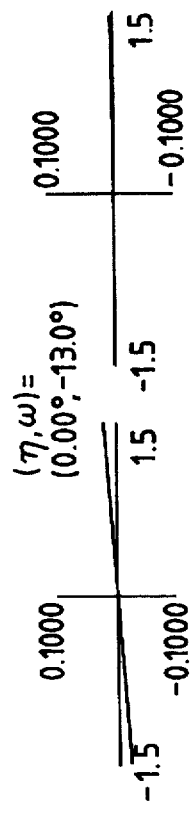
Figure 10C:
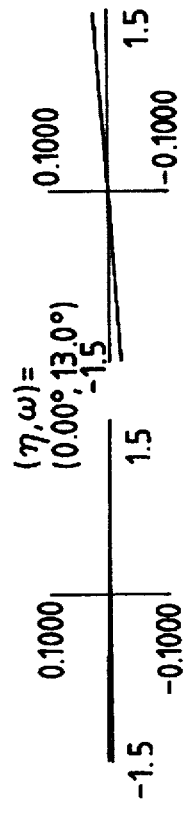
Figure 10D:
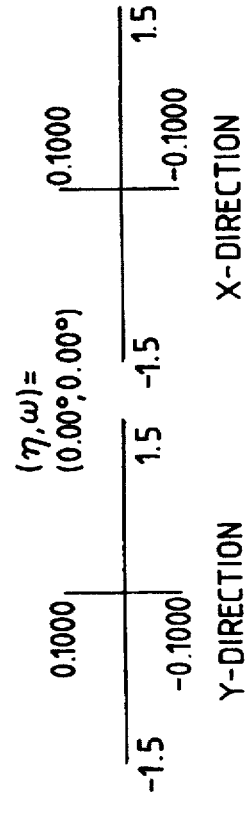

FIG. 9 is a schematic drawing to show the major part of Embodiment 3 of the present invention. The present embodiment has a higher refractive index of the optical element B1 than Embodiment 1 has. Table 5 shows data for the arrangement of Embodiment 3.

TABLE 5

| | f = 25 | N = 1.5709 | | |
|---|---|---|---|---|
| Surface | S1 | S2 | S3 | P |
| 1/r | −1.425e−02 | −3.458e−03 | −3.816e+05 | |
| k | 2.081e+00 | 3.740e+01 | −4.349e+19 | |
| $c_1$ | −1.552e−03 | −2.223e−03 | 3.382e−02 | |
| $c_2$ | −1.688e−05 | 7.360e−04 | −2.115e−02 | |
| $c_3$ | −1.525e−05 | −1.120e−06 | −9.858e−04 | |
| $c_4$ | 5.912e−06 | −7.827e−06 | 1.271e−03 | |
| $c_5$ | 2.190e−07 | 2.515e−07 | −2.113e−05 | |
| $c_6$ | −2.240e−09 | 5.836e−08 | 6.744e−06 | |
| $c_7$ | 2.052e−07 | 6.531e−09 | −4.684e−06 | |
| $c_8$ | 0.000e+00 | 0.000e+00 | 0.000e+00 | |
| $c_9$ | 0.000e+00 | 0.000e+00 | 0.000e+00 | |
| $c_{10}$ | 0.000e+00 | 0.000e+00 | 0.000e+00 | |
| SX | 0.00 | 0.00 | 0.00 | 0.00 (mm) |
| SY | 4.52 | −17.48 | 23.49 | 25.16 (mm) |
| SZ | 29.86 | 22.56 | 13.32 | 30.00 (mm) |
| A | −17.14 | 12.02 | 93.16 | 47.74 (deg) |

Table 6 includes the local radii of curvature $r_L$ of the second optically acting surface S2 of the present embodiment at six points on the acting surface.

TABLE 6

| | x | |
|---|---|---|
| y | 0 | 7.956 |
| | $r_{Lx}$(mm) | |
| 15.822 | 148.28 | 153.68 |
| 27.607 | 105.77 | 107.73 |
| 39.393 | 68.94 | 61.94 |
| | $r_{Ly}$(mm) | |
| 15.822 | −262.35 | −281.74 |
| 27.607 | −493.24 | −627.27 |
| 39.393 | 78.11 | 61.94 |

FIGS. 10A, 10B, 10C, and 10D are aberration diagrams of Embodiment 3. The aberration diagrams indicate lateral aberrations at the image point on the reference axial ray Lo, the image points of ±ω in the y-direction relative to the reference axial ray Lo, and the image point of +η in the x-direction relative to the reference axial ray Lo.

Figure 11:
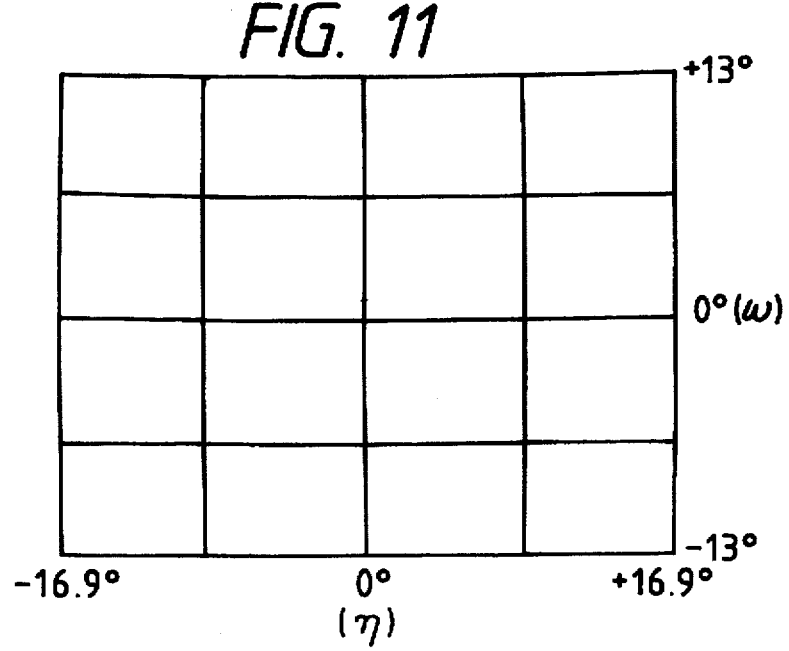
FIG. 11 is a drawing to show distortion by the optical system of Embodiment 3.

Further, FIG. 11 shows distortion of an image of the grid object when the ray trace is carried out from the pupil S to the display surface P in Embodiment 3.

Figure 12:
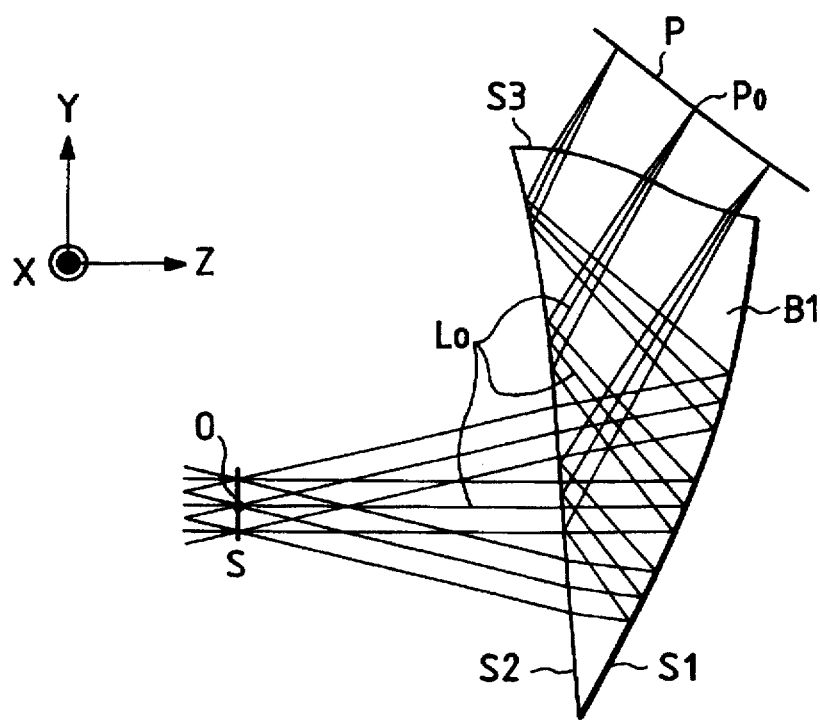
FIG. 12 is a schematic drawing to show the major part of Embodiment 4 of the image observing apparatus according to the present invention.
Figure 13A:
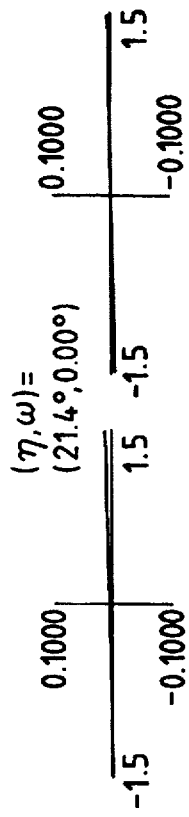
FIGS. 13A to 13D are aberration diagrams to show aberrations of the optical system in Embodiment 4.
Figure 13B:
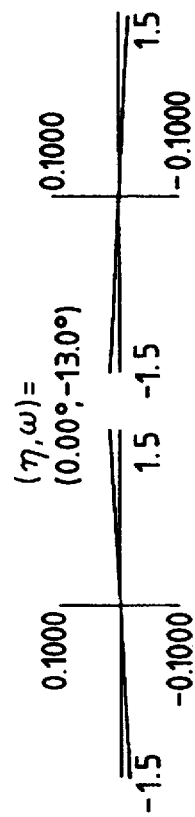
Figure 13C:
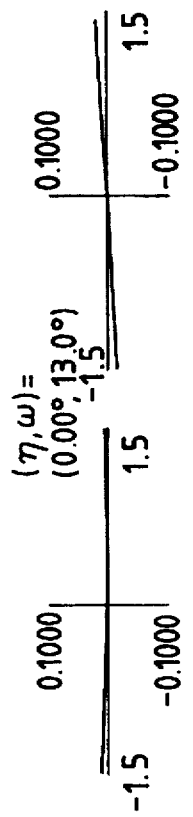
Figure 13D:
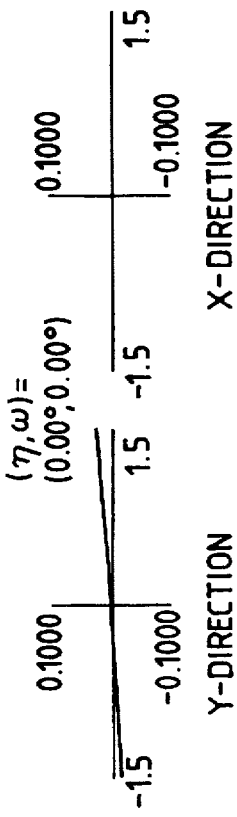

FIG. 12 is a schematic drawing to show the major part of Embodiment 4 of the image observing apparatus of the present invention. The present embodiment is a so-called anamorphic optical system in which the focal length fx in the z-x plane is set to be different from the focal length fy in the z-y plane. Table 7 shows data for the arrangement of the present embodiment.

TABLE 7

| | fx = 18.9 | fy = 25 | N = 1.4917 | |
|---|---|---|---|---|
| Surface | S1 | S2 | S3 | P |
| 1/r | −1.365e−02 | −3.666e−03 | 1.000e−18 | |
| k | 2.536e+00 | 4.900e+01 | 0.000e+00 | |

TABLE 7-continued

| | fx = 18.9 | fy = 25 | N = 1.4917 | |
|---|---|---|---|---|
| Surface | S1 | S2 | S3 | P |
| $c_1$ | −1.680e−03 | −6.306e−04 | −1.937e−02 | |
| $c_2$ | −5.361e−05 | 7.103e−04 | −9.103e−03 | |
| $c_3$ | −1.661e−05 | −1.425e−05 | −6.073e−04 | |
| $c_4$ | −3.827e−05 | −5.428e−05 | 8.702e−04 | |
| $c_5$ | −8.021e−07 | 4.539e−07 | −1.450e−05 | |
| $c_6$ | 7.894e−07 | 3.904e−07 | 9.317e−06 | |
| $c_7$ | 2.509e−07 | 2.408e−07 | 3.628e−06 | |
| $c_8$ | 3.169e−09 | −2.739e−09 | 3.961e−07 | |
| $c_9$ | −7.055e−09 | −4.684e−09 | −6.382e−07 | |
| $c_{10}$ | 4.031e−09 | −2.042e−08 | −1.100e−07 | |
| SX | 0.00 | 0.00 | 0.00 | 0.00 (mm) |
| SY | −13.43 | −13.71 | 19.27 | 23.92 (mm) |
| SZ | 19.40 | 20.58 | 25.76 | 27.89 (mm) |
| A | −35.10 | 4.64 | 65.10 | 53.42 (deg) |

Table 8 includes the local radii of curvature $r_L$ of the second optically acting surface S2 of the present embodiment at six points on the acting surface.

TABLE 8

| | $r_{Lx}$(mm) | |
|---|---|---|
| | x | |
| y | 0 | 9.29 |
| 11.49 | 150.81 | 172.70 |
| 22.61 | 103.08 | 88.38 |
| 33.74 | 86.24 | 53.95 |
| | $r_{Ly}$(mm) | |
| | x | |
| y | 0 | 7.43 |
| 11.49 | −2089.76 | −1052.29 |
| 22.61 | 208.58 | 242.14 |
| 33.74 | 26.38 | 20.44 |

FIGS. 13A, 13B, 13C, and 13D are aberration diagrams of Embodiment 4. The aberration diagrams indicate lateral aberrations at the image point on the reference axial ray Lo, the image points of ±ω in the y-direction relative to the reference axial ray Lo, and the image point of +η in the x-direction relative to the reference axial ray Lo.

Figure 14:
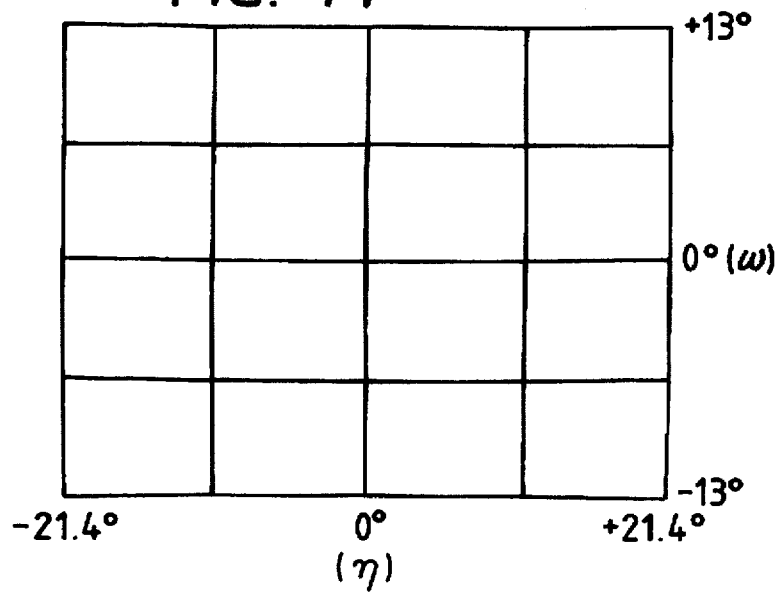
FIG. 14 is a drawing to show distortion by the optical system of Embodiment 4.

Further, FIG. 14 shows distortion of an image of the grid object when the ray trace is carried out from the pupil S to the display surface P in Embodiment 4. Since the focal length fx in the z-x plane is shorter than the focal length fy in the z-y plane, a virtual image of the image displayed on the display surface P is expanded 1.32 times larger in the x-direction than in the y-direction.

Figure 15:
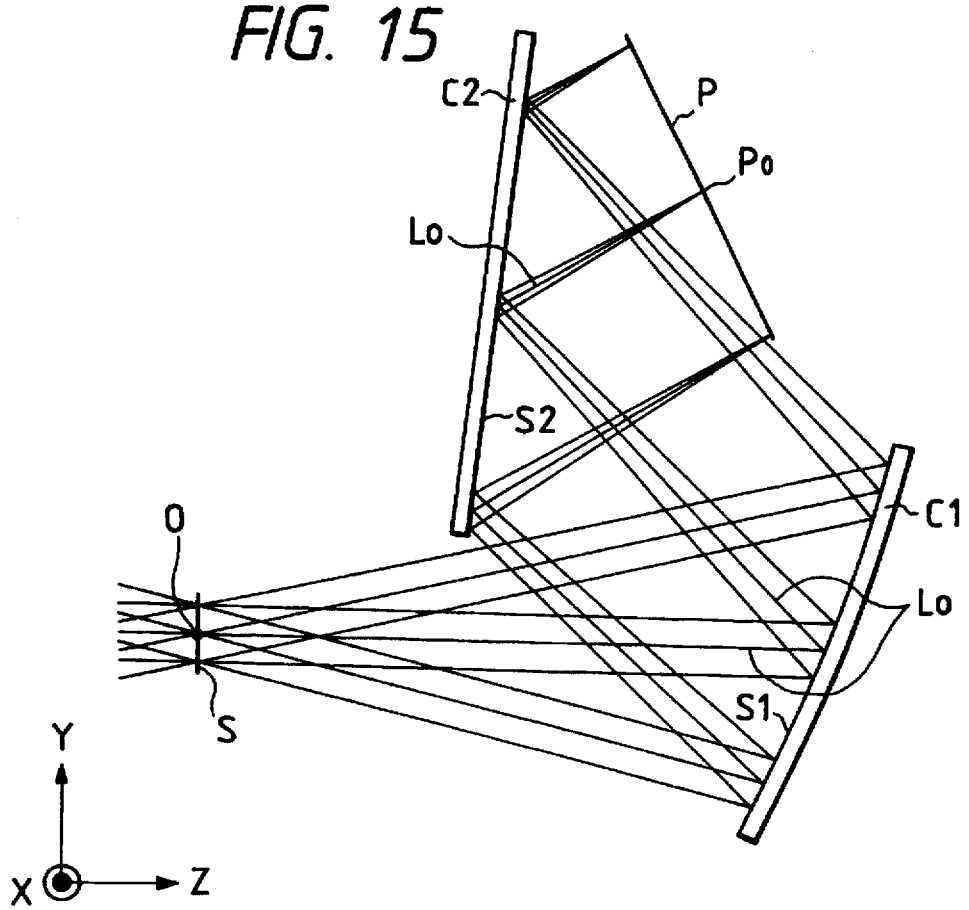
FIG. 15 is a schematic drawing to show the major part of Embodiment 5 of the image observing apparatus according to the present invention.
Figure 16A:
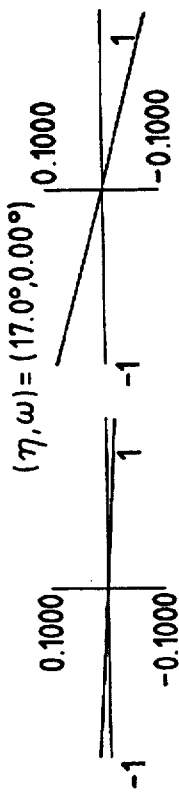
FIGS. 16A to 16D are aberration diagrams to show aberrations of the optical system in Embodiment 5.
Figure 16B:
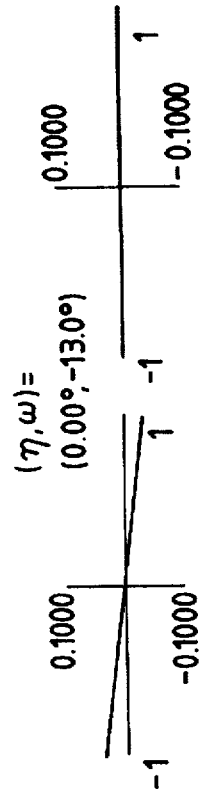
Figure 16C:
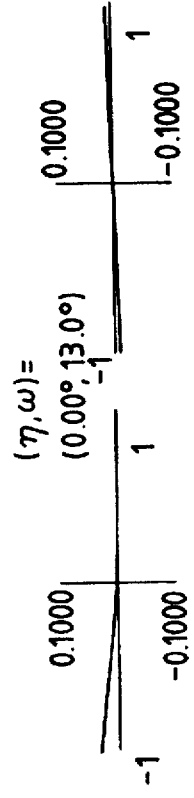
Figure 16D:
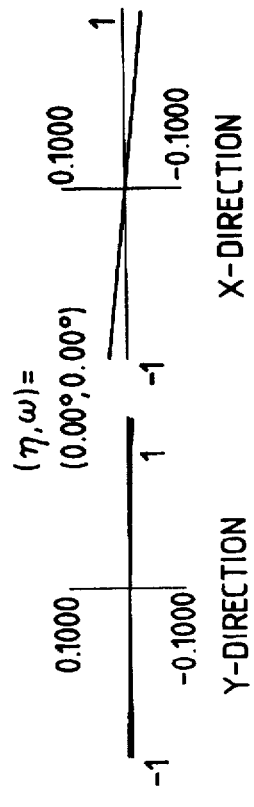

FIG. 15 is a schematic drawing to show the major part of Embodiment 5 of the image observing apparatus according to the present invention. The present embodiment has an arrangement different from those of the previous embodiments, and is arranged in such a manner that the optical system is composed of a first member C1 and a second member C2, the first member C1 has a first reflecting surface (first optically acting surface) S1 of an aspherical surface symmetric with respect to only one symmetry plane, and the surface is set as inclined relative to the reference axial ray Lo. The second member C2 has a second reflecting surface (second optically acting surface) S2 of an aspherical surface symmetric with respect to only the symmetry plane, and the surface is set as inclined relative to the reference axial ray Lo reflected by the first reflecting surface S1.

The action of the present embodiment is next explained. A light beam emerging from the image displayed on the display surface P of the image display device is reflected by the second reflecting surface S2 toward the first reflecting surface S1. Then the light beam is reflected and converged by this surface S1 to form an enlarged, virtual image of the image and to be incident to the pupil S of observer, whereby the observer can visually recognize the enlarged, virtual image of the image. Table 9 shows data for the arrangement of the present embodiment.

TABLE 9

| | f =25 | | |
|---|---|---|---|
| Surface | S1 | S2 | P |
| 1/r | −2.180e−02 | 9.607e−03 | |
| k | −2.403e+00 | −8.765e+05 | |
| $c_1$ | −1.690e−03 | −4.942e−03 | |
| $c_2$ | 1.054e−04 | −3.316e−03 | |
| $c_3$ | −3.020e−06 | −7.399e−05 | |
| $c_4$ | −3.106e−05 | −1.343e−04 | |
| $c_5$ | −2.921e−07 | 4.469e−06 | |
| $c_6$ | 5.002e−07 | 1.861e−06 | |
| $c_7$ | 1.721e−07 | 1.291e−06 | |
| $c_8$ | 3.848e−09 | −1.302e−08 | |
| $c_9$ | 2.030e−08 | −6.965e−08 | |
| $c_{10}$ | −7.029e−09 | −1.790e−07 | |
| SX | 0.00 | 0.00 | 0.00 (mm) |
| SY | 9.24 | 18.35 | 16.43 (mm) |
| SZ | 25.99 | 11.79 | 18.48 (mm) |
| A | −12.61 | −7.75 | 26.96 (deg) |

Table 10 indicates local powers of the second optically acting surface S2 of the present embodiment at six points on the acting surface.

TABLE 10

| | x | |
|---|---|---|
| y | 0 | 5.70 |
| | $r_{Lx}$(mm) | |
| −12.51 | 69.99 | −291.96 |
| −6.66 | 61.71 | 307.96 |
| −0.8 | 47.92 | 73.34 |
| | $r_{Ly}$(mm) | |
| −12.51 | −94.08 | −126.87 |
| −6.66 | −411.04 | −1494.01 |
| −0.8 | 345.00 | 277.42 |

FIGS. 16A, 16B, 16C, and 16D are aberration diagrams of Embodiment 5. The aberration diagrams indicate lateral aberrations at the image point on the reference axial ray Lo, the image points of ±η in the y-direction relative to the reference axial ray Lo, and the image point of +η in the x-direction relative to the reference axial ray Lo.

Figure 17:
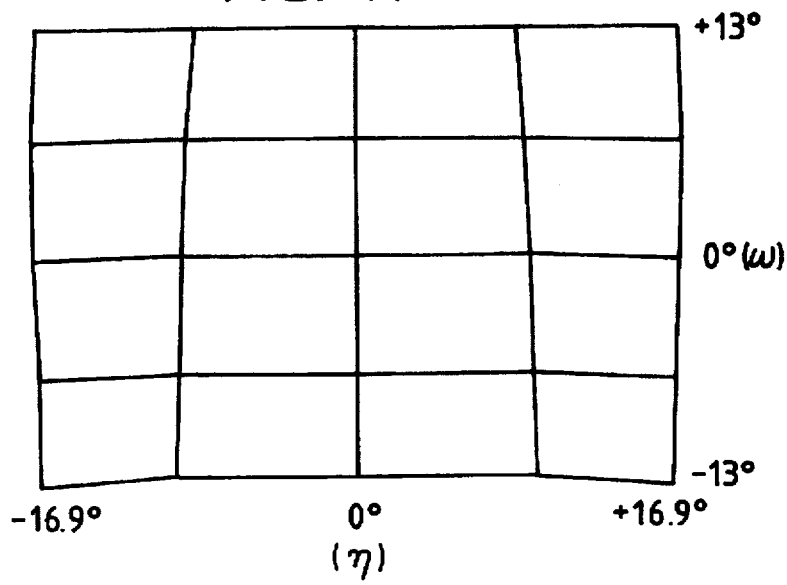
FIG. 17 is a drawing to show distortion by the optical system of Embodiment 5.

Further, FIG. 17 shows distortion of an image of the grid object when the ray trace is carried out from the pupil S to the display surface P in Embodiment 5.

Thus, the present embodiment obtains the optical system arranged in a particularly simple structure, which is well corrected for distortion, curvature of field, and astigmatism, and which almost satisfies the telecentric condition to the display surface.

Figure 20B:
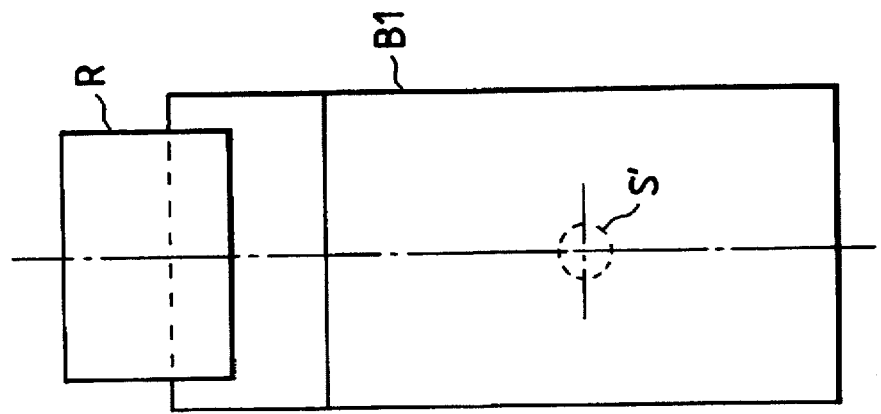
FIGS. 20A and 20B are schematic drawings to show the major part of the image pickup apparatus of the present invention.
Figure 20A:
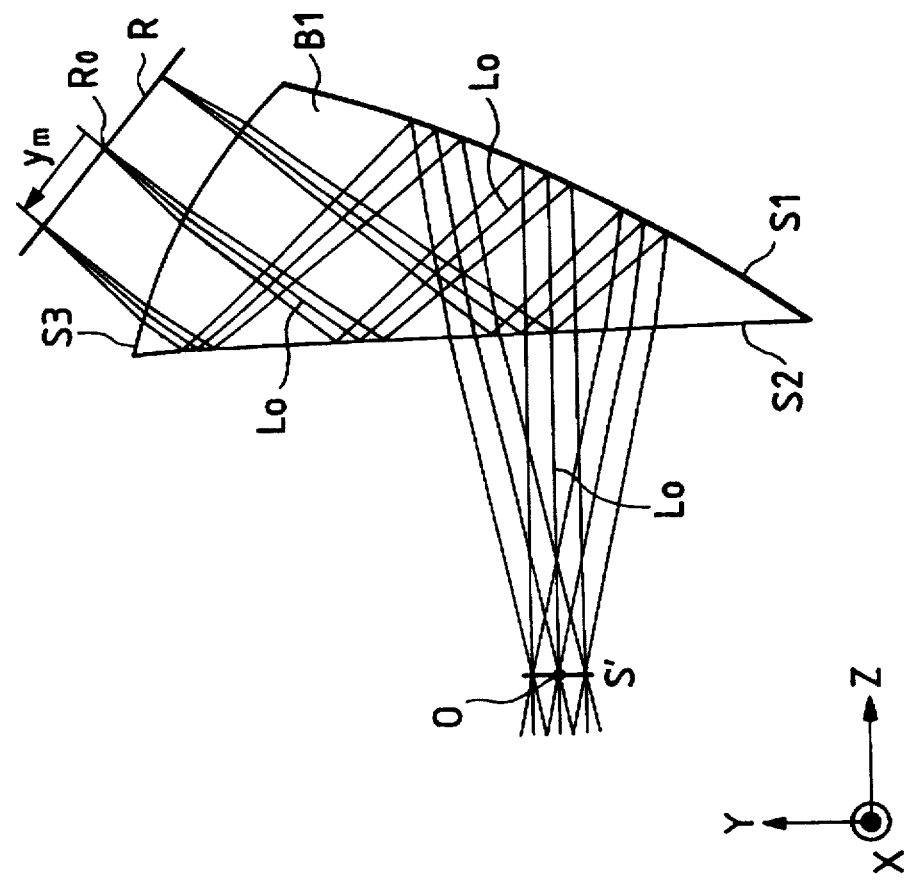

Each embodiment described above showed the optical system of the image observing apparatus, but an image pickup apparatus can also be constructed by setting the stop S' at the position of the pupil S and setting a recording surface of an image pickup means or a photoelectric conversion element R such as a CCD in place of the display surface P of the image display device, as shown in FIGS. 20A and 20B. This arrangement can achieve are image pickup apparatus well corrected for the various aberrations and satisfying the telecentric condition to the image pickup surface at a wide angle.

Since the arrangement of the optical element B1 in the present embodiment is the same as in Embodiment 1, description thereof is omitted herein. It is, however, noted that the optical elements and optical systems shown in Embodiments 2–5 can also be employed.

The present invention can achieve an optical system having a simple structure and demonstrating good optical performance, based on the above arrangements.

Particularly, if the first optically acting surface, the second optically acting surface, and the third optically acting surface are formed on a medium such as glass or plastics, the optical system can be constructed in a single optical element, which permits a high-performance optical system to be manufactured at low cost.

What is claimed is:

1. An optical system comprising, in an optical path between a stop and a focal plane:

a first surface symmetric with respect to only one symmetry plane; and a second surface symmetric with respect to only said symmetry plane, wherein said first surface is a reflective, concave surface and is inclined relative to a reference axial ray present in said symmetry plane, wherein said reference axial ray is one of (i) a ray which emerges from a center of the stop and is perpendicularly incident on a center of the focal plane and (ii) a ray which emerges perpendicularly from the center of the focal plane and is incident on the center of the stop, and wherein said second surface is configured so that a power of a partial area of said second surface changes from positive to negative corresponding to respective locations thereof.

2. The optical system according to claim 1, wherein the power of a partial area of said second surface as to rays in said symmetry plane changes from positive to negative along a cut line where said symmetry plane cuts said second surface.

3. The optical system according to claim 2, wherein the power of a partial area of said second surface as to rays in said symmetry plane changes from positive to negative in a direction of from a shorter optical pathlength to a longer optical pathlength between said first surface and second surface along said cut line.

4. The optical system according to claim 2, wherein the power of a partial area of said second surface as to rays in the symmetry plane corrects for astigmatism occurring at said first surface.

5. The optical system according to claim 2, wherein the power of a partial area of said second surface as to rays in a plane including said reference axial ray and being perpendicular to said symmetry plane and in a plane parallel to said plane changes from positive to negative along said cut line.

6. The optical system according to claim 5, wherein the power of a partial area of said second surface as to the rays in the plane including said reference axial ray and being perpendicular to said symmetry plane and in the plane parallel to said plane changes from positive to negative in a direction of from a shorter optical pathlength to a longer optical pathlength between said first surface and second surface along said cut line.

7. The optical system according to claim 5, wherein the power of a partial area of said second surface as to rays in said symmetry plane and the power of a partial area of said second surface as to the rays in the plane including said reference axial ray and being perpendicular to said symmetry plane and in the plane parallel to said plane correct for astigmatism occurring at said first surface.

8. The optical system according to claim 2, wherein the power of a partial area of said second surface as to rays in a plane including said reference axial ray and being perpendicular to said symmetry plane and in a plane parallel to said plane changes from weak negative to strong negative along said cut line.

9. The optical system according to claim 8, wherein the power of a partial area of said second surface as to the rays in the plane including said reference axial ray and being perpendicular to said symmetry plane and in the plane parallel to said plane changes from weak negative to strong negative in a direction of from a shorter optical pathlength to a longer optical pathlength between said first surface and second surface along said cut line.

10. The optical system according to claim 8, wherein the power of a partial area of said second surface as to rays in said symmetry plane and in a plane parallel to said symmetry plane and the power of a partial area of said second surface as to rays in the plane perpendicular to said symmetry plane and in the plane parallel to said plane correct for astigmatism occurring at said first surface.

11. The optical system according to claim 1, wherein the power of a partial area of said second surface as to rays in a plane including said reference axial ray and being perpendicular to said symmetry plane and in a plane parallel to said plane changes from positive to negative along a cut line where said symmetry plane cuts said second surface.

12. The optical system according to claim 11, wherein the power of a partial area of said second surface as to the rays in the plane including said reference axial ray and being perpendicular to said symmetry plane and in the plane parallel to said plane changes from positive to negative in a direction of from a shorter optical pathlength to a longer optical pathlength between said first surface and second surface along said cut line.

13. The optical system according to claim 11, wherein the power of a partial area of said second surface as to the rays in the plane including said reference axial ray and being perpendicular to said symmetry plane and in the plane parallel to said plane corrects for astigmatism occurring at said first surface.

14. The optical system according to claim 1 further comprising a solid optical element which is provided with said first surface and said second surface.

15. An image observing apparatus comprising:
image display means for displaying an image; and
an optical system having a first surface and a second surface symmetric with respect to only one symmetry plane,
wherein said second surface guides light from the image to said first surface,
wherein said first surface is a reflective, concave surface and is inclined relative to a reference axial ray present in said symmetry plane, wherein said reference axial ray is a ray which emerges perpendicularly from a center of the image and is incident on a center of a stop, and wherein said second surface is configured so that a power of a partial area of said second surface changes from positive to negative corresponding to respective locations thereof.

16. The image observing apparatus according to claim 15, wherein the power of a partial area of said second surface as to rays in said symmetry plane changes from positive to negative along a cut line where said symmetry plane cuts said second surface.

17. The image observing apparatus according to claim 16, wherein the power of a partial area of said second surface as to rays in said symmetry plane changes from positive to negative in a direction of from a shorter optical pathlength to a longer optical pathlength between said first surface and second surface along said cut line.

18. The image observing apparatus according to claim 16, wherein the power of a partial area of said second surface as to rays in the symmetry plane corrects for astigmatism occurring at said first surface.

19. The image observing apparatus according to claim 16, wherein the power of a partial area of said second surface as to rays in a plane including said reference axial ray and being perpendicular to said symmetry plane and in a plane parallel to said plane changes from positive to negative along said cut line.

20. The image observing apparatus according to claim 19, wherein the power of a partial area of said second surface as to the rays in the plane including said reference axial ray and being perpendicular to said symmetry plane and in the plane parallel to said plane changes from a positive to negative in direction of from a shorter optical pathlength to a longer optical pathlength between said first surface and second surface along said cut line.

21. The image observing apparatus according to claim 19, wherein the power of a partial area of said second surface as to rays in said symmetry plane and the power of a partial area of said second surface as to the rays in the plane including said reference axial ray and being perpendicular to said symmetry plane and in the plane parallel to said plane correct for astigmatism occurring at said first surface.

22. The image observing apparatus according to claim 16, wherein the power of a partial area of said second surface as to rays in a plane including said reference axial ray and being perpendicular to said symmetry plane and in a plane parallel to said plane changes from weak negative to strong negative along said cut line.

23. The image observing apparatus according to claim 22, wherein the power of a partial area of said second surface as to the rays in the plane including said reference axial ray and being perpendicular to said symmetry plane and in the plane parallel to said plane changes from weak negative to strong negative in a direction of from a shorter optical pathlength to a longer optical pathlength between said first surface and second surface along said cut line.

24. The image observing apparatus according to claim 22, wherein the power of a partial area of said second surface as to rays in said symmetry plane and the power of a partial area of said second surface as to rays in a plane including said reference axial ray and being perpendicular to said symmetry plane and in a plane parallel to said plane correct for astigmatism occurring at said first surface.

25. The image observing apparatus according to claim 15, wherein the power of a partial area of said second surface as to rays in a plane including said reference axial ray and being perpendicular to said symmetry plane and in a plane parallel to said plane changes from positive to negative along a cut line where said symmetry plane cuts said second surface.

26. The image observing apparatus according to claim 25, wherein the power of a partial area of said second surface as to the rays in the plane including said reference axial ray and being perpendicular to said symmetry plane and in the plane parallel to said plane changes from positive to negative in a direction of from a shorter optical pathlength to a longer optical pathlength between said first surface and second surface along said cut line.

27. The image observing apparatus according to claim 25, wherein the power of a partial area of said second surface as to the rays in the plane including said reference axial ray and being perpendicular to said symmetry plane and in the plane parallel to said plane corrects for astigmatism occurring at said first surface.

28. The image observing apparatus according to claim 15, wherein said optical system has a third surface, and wherein the light from said image is incident to said third surface to be directed toward said second surface, then is reflected by said second surface toward said first surface, is converged and reflected by said first surface to be directed again toward said second surface, and is emergent from said second surface toward an observer.

29. The image observing apparatus according to claim 28, wherein said optical system is a prism having said first, second, and third surfaces.

30. The image observing apparatus according to claim 15, wherein the stop comprises an observer's pupil.

31. An image pickup apparatus comprising:

image pickup means for receiving light from an object; and an optical system having a first surface and a second surface symmetric with respect to only one symmetry plane, wherein said first surface guides the light from the object to said second surface, wherein said first surface is a reflective, concave surface and is inclined relative to a reference axial ray present in said symmetry plane, wherein said reference axial ray is a ray which emerges from a center of a stop and is perpendicularly incident on a center of an image plane, and wherein said second surface is configured so that a power of a partial area of said second surface changes from positive to negative corresponding to respective locations thereof.

32. The image pickup apparatus according to claim 31, wherein the power of a partial area of said second surface as to rays in said symmetry plane changes from positive to negative along a cut line where said symmetry plane cuts said second surface.

33. The image pickup apparatus according to claim 32, wherein the power of a partial area of said second surface as to the rays in said symmetry plane changes from positive to negative in a direction of from a shorter optical pathlength to a longer optical pathlength between said first surface and second surface, along said cut line.

34. The image pickup according to claim 32, wherein the power of a partial area of said second surface as to the rays in said symmetry plane corrects for astigmatism occurring at said first surface.

35. The image pickup apparatus according to claim 32, wherein the power of a partial area of said second surface as to rays in a plane including said reference axial ray and being perpendicular to said symmetry plane and in a plane parallel to said plane changes from positive to negative along said cut line.

36. The image pickup apparatus according to claim 35, wherein the power of a partial area of said second surface as to the rays in the plane including said reference axial ray and being perpendicular to said symmetry plane and in the plane parallel to said plane changes from positive to negative in a direction of from a shorter optical pathlength to a longer optical pathlength between said first surface and second surface along said cut line.

37. The image pickup apparatus according to claim 35, wherein the power of a partial area of said second surface as to rays in said symmetry plane and the power of a partial area of said second surface as to the rays in the plane including said reference axial ray and being perpendicular to said symmetry plane and in the plane parallel to said plane corrects for astigmatism occurring at said first surface.

38. The image pickup according to claim 32, wherein the power of a partial area of said second surface as to rays in a plane including said reference axial ray and being perpendicular to said symmetry plane and in a plane parallel to said plane changes from weak negative to strong negative along said cut line.

39. The image pickup apparatus according to claim 38, wherein the power of a partial area of said second surface as to the rays in the plane including said reference axial ray and being perpendicular to said symmetry plane and in the plane parallel to said plane changes from weak negative to strong negative in a direction of from a shorter optical pathlength to a longer optical pathlength between said first surface and second surface along said cut line.

40. The image pickup apparatus according to claim 38, wherein the power of a partial area of said second surface as to rays in said symmetry plane and the power of a partial area of said second surface as to rays in a plane including said reference axial ray and being perpendicular to said symmetry plane and in a plane parallel to said plane correct for astigmatism occurring at said first surface.

41. The image pickup apparatus according to claim 31, wherein the power of a partial area of said second surface as to rays in a plane including said reference axial ray and being perpendicular to said symmetry plane and in a plane parallel to said plane changes from positive to negative along a cut line where said symmetry plane cuts said second surface.

42. The image pickup apparatus according to claim 41, wherein the power of a partial area of said second surface as to the rays in the plane including said reference axial ray and being perpendicular to said symmetry plane and in the plane parallel to said plane changes from positive to negative in a direction of from a shorter optical pathlength to a longer optical pathlength between said first surface and second surface along said cut line.

43. The image pickup apparatus according to claim 41, wherein the power of a partial area of said second surface as to the rays in the plane including said reference axial ray and being perpendicular to said symmetry plane and in the plane parallel to said plane corrects for astigmatism occurring at said first surface.

44. The image pickup apparatus according to claim 31, wherein said optical system has a third surface, and wherein the light from said object is incident to said second surface to be directed toward said first surface, then is reflected by said first surface to be directed again to said second surface, is totally reflected by said second surface toward said third surface, and is emergent from said third surface toward said image pickup means.

45. The image pickup apparatus according to claim 44, wherein said optical system is a prism having said first, second, and third surfaces.

46. The image pickup apparatus according to claim 31, wherein said optical system comprises a solid optical element which is provided with said first surface and said second surface.

47. An optical system comprising, in an optical path between a stop and a focal plane:

a first surface symmetric with respect to only one symmetry plane; and a second surface symmetric with respect to only said symmetry plane;

wherein said first surface is a reflective, concave surface and is inclined relative to a reference axial ray present in said symmetry plane, wherein said reference axial ray is one of (i) a ray which emerges from a center of the stop and is perpendicularly incident on a center of the focal plane and (ii) a ray which emerges perpendicularly from the center of the focal plane and is incident on the center of the stop, and wherein said second surface is configured so that a local power $\rho_L$, where $\rho_L = -2N/r_L$, N is a refractive index of a medium in which the light travels, and $r_L$ is the local radius of curvature at a location of said second surface, changes from positive to negative corresponding to respective locations thereof.

48. An image observing apparatus comprising:

image display means for displaying an image; and an optical system having a first surface and a second surface symmetric with respect to only one symmetry plane, wherein said second surface guides light from the image to said first surface, wherein said first surface is a reflective, concave surface and is inclined relative to a reference axial ray present in said symmetry plane, wherein said reference axial ray is a ray which emerges perpendicularly from a center of the image and is incident on a center of a stop, and wherein said second surface is configured so that a local power $\rho_L$, where $\rho_L = -2N/r_L$, N is a refractive index of a medium in which the light travels, and $r_L$ is the local radius of curvature at a location of said second surface, changes from positive to negative corresponding to respective locations thereof.

49. An image pickup apparatus comprising:

image pickup means for receiving light from an object; and an optical system having a first surface and a second surface symmetric with respect to only one symmetry plane, wherein said first surface guides the light from the object to said second surface, wherein said first surface is a reflective, concave surface and is inclined relative to a reference axial ray present in said symmetry plane, wherein said reference axial ray is a ray which emerges from a center of a stop and is perpendicularly incident on a center of an image plane, and wherein said second surface is configured so that a local power $\rho_L$, where $\rho_L = -2N/r_L$, N is a refractive index of a medium in which the light travels, and $r_L$ is the local radius of curvature at a location of said second surface, changes from positive to negative corresponding to respective locations thereof.

* * * * *